US008506214B2

United States Patent
Ribbeck et al.

(10) Patent No.: US 8,506,214 B2
(45) Date of Patent: Aug. 13, 2013

(54) METHOD FOR MACHINING BEVEL GEARS USING AN INDEXING METHOD HAVING COMPLETE INDEXING ERROR COMPENSATION

(75) Inventors: Karl-Martin Ribbeck, Remscheid (DE); Torsten König, Hohndorf (DE)

(73) Assignee: Klingelnberg GmbH, Hückeswagen (DE)

( * ) Notice: Subject to any disclaimer, the term of this patent is extended or adjusted under 35 U.S.C. 154(b) by 1319 days.

(21) Appl. No.: 12/278,005

(22) PCT Filed: Feb. 8, 2007

(86) PCT No.: PCT/EP2007/051228
§ 371 (c)(1),
(2), (4) Date: Sep. 4, 2008

(87) PCT Pub. No.: WO2007/090871
PCT Pub. Date: Aug. 16, 2007

(65) Prior Publication Data
US 2009/0028655 A1 Jan. 29, 2009

(30) Foreign Application Priority Data
Feb. 10, 2006 (EP) .................................... 06002768

(51) Int. Cl.
*B23F 9/12* (2006.01)
(52) U.S. Cl.
USPC ........................................ 409/27; 29/893.35
(58) Field of Classification Search
USPC .............................. 409/25, 26, 27; 29/893.35
See application file for complete search history.

(56) References Cited

U.S. PATENT DOCUMENTS

| | | | | |
|---|---|---|---|---|
| 3,212,403 A | * | 10/1965 | Deakin | 409/27 |
| 4,182,045 A | * | 1/1980 | Bosch et al. | 33/501.9 |
| 4,393,625 A | * | 7/1983 | Bloch et al. | 451/21 |
| 4,400,916 A | * | 8/1983 | Bloch et al. | 451/21 |
| 4,893,971 A | | 1/1990 | Watanabe et al. | |
| 4,954,027 A | * | 9/1990 | Faulstich | 409/26 |
| 5,961,260 A | * | 10/1999 | Kasler et al. | 409/25 |

(Continued)

FOREIGN PATENT DOCUMENTS

| | | |
|---|---|---|
| DE | 28 33 923 A1 | 3/1979 |
| DE | 39 01 621 A1 | 8/1989 |

OTHER PUBLICATIONS

International Search Report for PCT/EP2007/051228.

*Primary Examiner* — David Bryant
*Assistant Examiner* — Jason L Vaughan
(74) *Attorney, Agent, or Firm* — McCormick, Paulding & Huber LLP

(57) ABSTRACT

The invention relates to an apparatus for machining bevel gears in an indexing method and method for machining the pitch of gears, wherein the production-related pitch error is compensated. The apparatus (20) comprises an interface (11, 12) and can be connected to a measurement system (10) by means of this interface (11, 12). The interface is designed such that the apparatus (20) can take correction values or correction factors from the measurement system (10) in a form in order to be able to adapt master data or neutral data. The data, which was originally present in a memory (51) of the apparatus (20), is corrected on the basis of these correction values or correction factors before production of one or more bevel gears (31) is initiated on the apparatus (20).

8 Claims, 5 Drawing Sheets

(56) References Cited

U.S. PATENT DOCUMENTS 7,402,007 B2 * 7/2008 Fahrer et al. .................. 409/51
2005/0025597 A1 * 2/2005 Klingen et al. ................ 409/26
2005/0159938 A1 * 7/2005 Shigemi et al. ................ 703/7

* cited by examiner

METHOD FOR MACHINING BEVEL GEARS USING AN INDEXING METHOD HAVING COMPLETE INDEXING ERROR COMPENSATION

CROSS REFERENCE TO RELATED APPLICATION

This application claims the benefit of PCT Application No. PCT/EP2007/051228, filed Feb. 8, 2007 and European Patent Application No. EP 06 002 768.7, filed Feb. 10, 2006, the disclosures of which are herein incorporated by reference in their entirety.

FIELD OF THE INVENTION

The invention relates to devices for machining bevel gears in the indexing method and methods for the indexing machining of gear wheels, the manufacturing-related indexing errors being compensated for.

BACKGROUND OF THE INVENTION

One essentially differentiates between machine tools which operate in the indexing method and machine tools which operate continuously. In the indexing method, a tooth gap is machined, then a relative displacement movement, to move the tool out of a tooth gap, and a so-called single indexing movement (indexing rotation), in which the gear wheel rotates in relation to the tool before the next tooth gap is then machined, occur. A gear wheel is thus manufactured step-by-step. A gear-cutting machine which operates in the indexing method is typically provided with indexing apparatus which rotates the workpiece by one or more indices around the workpiece axis before the tool engages again.

In modern machines, a CNC controller is employed, which is designed in such a way that the indexing movement may be executed at the suitable moment.

The continuous method, sometimes also referred to as the continuous indexing method, is based on more complex movement sequences, in which the tool and the workpiece to be machined execute a continuous indexing movement in relation to one another. The indexing movement results from the coordinated driving of multiple axial drives.

The indexing method has the disadvantage that so-called indexing errors occur. These are caused because the temperature of the workpiece changes during the gear-cutting machining by milling of a workpiece. With increasing temperature, deviations from the presets thus result. Indexing errors also result during the grinding, the errors not occurring due to heating (grinding oil is used in operation), but rather by tool wear during the machining of the individual gaps. The grinding disk is typically dressed again before each new workpiece, so that a similar wear occurs for each workpiece over the individual gaps.

Up to this point, such indexing errors have been compensated for in that the indexing error sum is ascertained and then converted into a compensation. The indexing error sum is typically divided by the tooth count, which results in a so-called linear compensation. This type of compensation is not satisfactory, however, because all teeth are changed in the event of a linear compensation, which may have the result that teeth are changed which were actually seated at the correct location.

Therefore, the invention is based on the object of providing an approach which allows the indexing method in the mass production of bevel gears to be made more precise and to be automated.

The object is achieved according to the invention by a device having a workpiece spindle for receiving a bevel gear, a tool spindle for receiving a tool and multiple drives (X, Y, Z, B, C, A1) for machining the bevel gear in the single-indexing method. The device comprises an interface and is connectable to a measurement system via this interface, the interface being designed in such a way that the device may receive correction values or correction factors from the measurement system in a form to be able to adapt master data or neutral data originally present in a memory of the device. The data is modified on the basis of these correction values or correction factors, before manufacturing of one or more bevel gears on the device is initiated.

This object is achieved according to the invention in that a device is used which is equipped with a workpiece spindle for receiving a bevel gear, a tool spindle for receiving a milling tool, and multiple drives for machining the bevel gear in the single-indexing method. In this single-indexing method, one tooth gap of the gear wheel is machined, then a relative movement is executed between tool and workpiece to remove the tool from the tooth gap, then the bevel gear executes a partial rotation and the milling tool is infed to machine a further tooth gap. According to the invention, the drives are activatable via a controller in such a way that the relative movements and the partial rotations occur so that the indexing error which was ascertained on a prior sample workpiece manufactured on the machine is compensated for in the bevel gear currently to be manufactured in the machine.

This object is also achieved according to the invention in that a special 6-axis device is used for machining a bevel gear, which comprises a workpiece spindle for receiving the bevel gear, a tool spindle for receiving a tool, and drives for machining the bevel gear using the tool. The device executes the following steps of a completing method in which both tooth flanks of a tooth gap are manufactured simultaneously in each case:
  predefining master or neutral data which describe the shape of a bevel gear to be mass produced and the machine tool kinematics required for this purpose,
  executing the following machining steps in the single-indexing completing method on the basis of the master or neutral data,
    a) machining one tooth gap of a sample workpiece using the tool by executing a machining movement,
    b) executing a relative movement between the tool and sample workpiece to remove the tool from the tooth gap,
    c) executing an indexing rotation to transfer the sample workpiece into another angular position,
    d) machining a further tooth gap of the sample workpiece using the tool by repeated execution of steps a)-c), these steps being repeated until all tooth gaps of the sample workpiece are manufactured,
  ascertaining the indexing error (for example, in a gear-cutting measurement center) of all teeth of the sample workpiece,
  ascertaining a suitable indexing error compensation per tooth,
  transmitting or providing correction values (offset for the indexing angle and/or the plunging depth of the tool),
  adapting the machine data of the 6-axis device on the basis of the correction values as a preparation for the mass production of a series of bevel gears compensated for indexing errors,
  production of the bevel gears compensated for indexing errors using the adapted machine data by executing steps a)-d), these steps being repeated until all tooth gaps of a bevel gear compensated for indexing errors are manufactured.

According to the invention, the control data or machine data are altered by ascertaining the indexing error compensation in such a way that a plurality of the machining movements and the indexing rotations is altered in relation to the original presets which were set during manufacturing of the sample workpiece defined by the master or neutral data.

In other words, the indexing errors are compensated over at least two of the six axes or even over all axes. Thereby at least the rotation is altered by adaptation of the partial rotations and the depth of the tooth gaps is altered by adapting the machining movements, and tooth-to-tooth. The adaptation is not a linear adaptation, but rather an individual adaptation occurs per tooth or per tooth gap, respectively, according to the invention.

I.e., according to the invention each tooth or each tooth gap of the bevel gears to be manufactured in mass production is corrected individually per se, so that each tooth or each tooth gap is seated at the "correct" point. Reference is made to one of the z teeth of the bevel gear. This one tooth is used as a quasi-reference tooth for the compensation of the indexing errors.

The invention is concerned in particular with the dry milling of bevel gears in the single-indexing completing method. The invention is especially suitable for dry milling, because the indexing errors are clearer in dry milling. This is because, inter alia, the temperature is increased more strongly during the milling machining than in the case of wet milling and the machine thus cuts more deeply than "desired". If the material becomes hotter, the tooth gap typically also becomes larger. Depending on the manufacturing method, the temperature of the workpiece moves from room temperature at the beginning to temperatures between approximately 40 and 50° toward the end of the machining.

The method is also suitable for indexing error compensation in the grinding of gear wheels. During grinding, the grinding disc is dressed before the machining of the component. During the grinding machining, the grinding disc wears away in its height and width, so that the tooth gaps become ever shallower and narrower. The grinding disc is dressed again before the machining of the next component. The compensation method may also be applied in this case.

After ascertaining the indexing error on the sample workpiece, it is ascertained by computer how the indexing angle τ (indexing rotation) and/or the plunging depth (machining movement) must be altered so that the deep cutting or the too shallow cutting may be compensated for in mass production, as described.

BRIEF DESCRIPTION OF THE DRAWINGS

Exemplary embodiments of the invention are described in greater detail hereafter with reference to the drawings.

DESCRIPTION OF THE PREFERRED EMBODIMENTS

Terms which are also used in relevant publications and patents are used in connection with the present description. However, it is to be noted that the use of these terms is solely to serve for better understanding. The ideas according to the invention and the scope of protection of the claims are not to be restricted in the interpretation by the specific selection of the terms. The invention may be transferred without further measures to other term systems and/or fields. The terms are to be applied accordingly in other fields.

Figure 1:
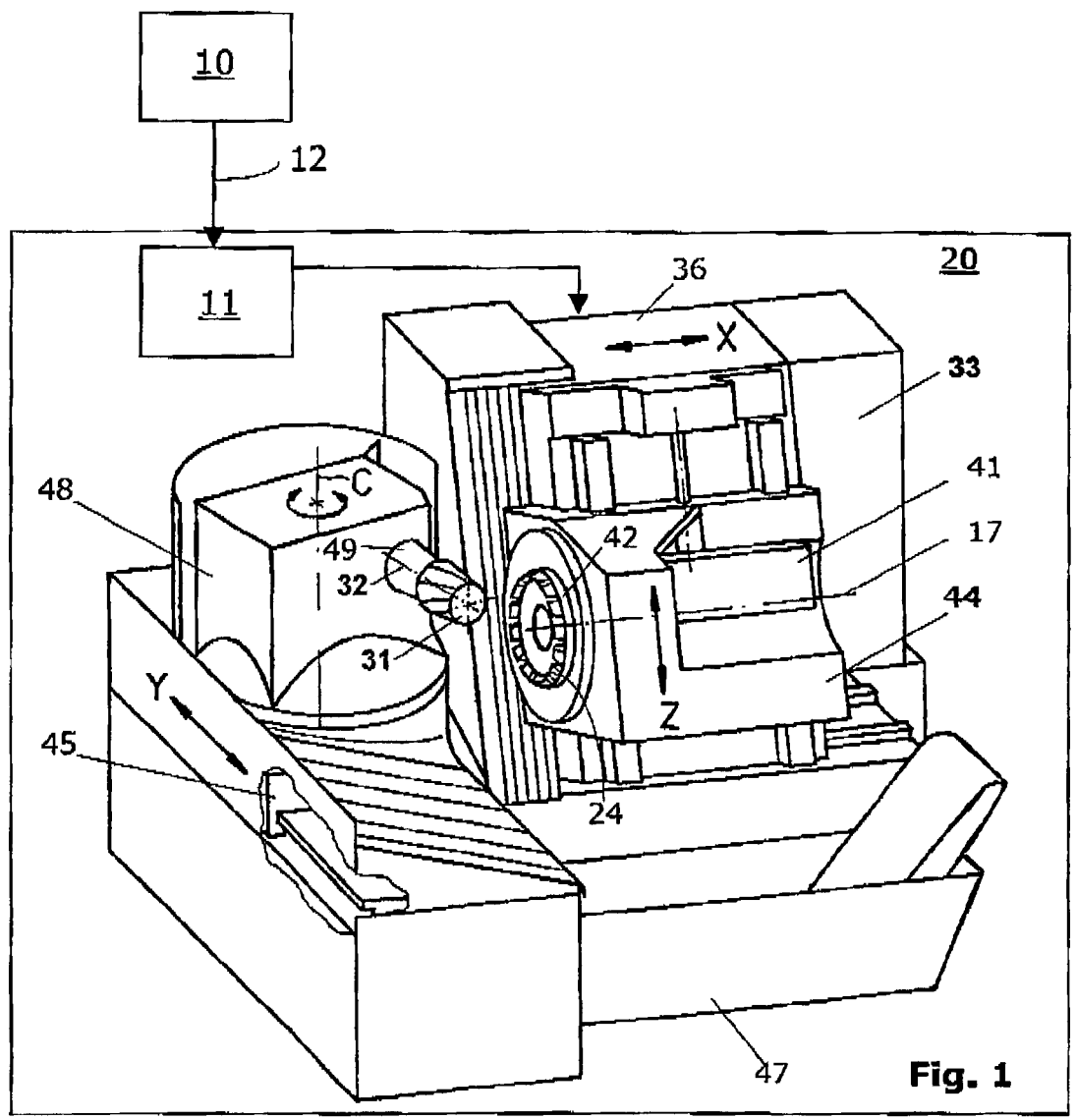
FIG. 1 shows a view of a bevel gear milling machine according to the invention having six axes.

A first device 20 according to the invention is shown in FIG. 1. This machine 20 according to the invention may entirely or partially correspond, for example, to the CNC machine for producing spiral bevel gears already described in the application DE 196 46 189 C2. It has a drive motor 41 for rotating the face cutter head 24 around its axis of rotation 17. Motor 41 and face cutter head 24 are located on a first slide 44, which is guided laterally on a machine tool housing 36 and is movable in height (parallel to the Z axis). The machine tool housing 36 is in turn movable horizontally on a machine tool bed 47 (parallel to the X axis), on which a second slide 45 is additionally located. This second slide 45 carries a workpiece carrier 48 rotatable around the vertical axis C having a workpiece spindle 49 and a workpiece 31, which is mounted in the workpiece carrier 48 so it is rotatable around a horizontal axis 32. The second slide 45 is also horizontally movable (parallel to the Y axis), but perpendicularly to the X axis of the machine tool housing 36 and to the Z axis of the first slide 44. These machine tool components thus form the mechanical requirements for producing bevel gears by a rolling process in the single-indexing method using indexing compensation according to the invention. The decisive difference of this machine according to the present invention to a typical machine comprises altered control means of the CNC controller, which is housed in the switch cabinet 33. According to the invention, the control means comprise a controller which loads new control data after the manufacturing of at least one sample workpiece, which are then used for the mass production of bevel gears compensated for indexing error.

According to the invention, a tooth gap of a bevel gear is machined after an infeed movement. This procedure is called a machining procedure and the corresponding movement a machining movement. A relative movement then occurs between tool and workpiece to remove the tool from the tooth gap. The relative movement may be a tilting movement or a combined movement which is composed of a translational movement and tilting movement.

The tool is removed from the tooth gap by the relative movement without colliding with the just-manufactured flanks of adjacent teeth. According to the invention, an indexing rotation is now executed around the axis of rotation of the workpiece and the tool is infed again. This indexing rotation is slightly changed in relation to the corresponding partial rotation which was executed on the sample workpiece, in order to compensate for the indexing errors.

In the machine 20 according to the invention, which is equipped with a CNC controller, the indexing error compensation is performed "electronically", i.e., by suitable adaptation of the individual movement sequences.

A controller according to the invention may be programmed in such a way that the altered control data are loaded before the beginning of the actual mass production, to then adapt the machine data, i.e., the data which establish the movement of the individual axes.

An embodiment is especially preferred in which the CNC controller comprises a special software module (for example, software module 11 in FIG. 1), which allows altered control data to be accepted from a measuring machine tool 10, as schematically indicated in FIG. 1 on the basis of an arrow 12.

The corresponding block diagram of a device 20 according to the invention is shown in FIG. 1. The device 20 has six drives X, Y, Z, B, C, and A1, which are shown as function blocks in FIG. 1. Each of these drives is controlled from a CNC controller 40. In the example shown, the connections between the CNC controller 40 and the drives are shown by double arrows, which is to indicate that the drives may give feedback to the controller 40. The rotational drives B, C, A1 may provide feedback about the torque, for example, or angle encoders may be used to transmit the angular position to the controller 40. For example, the drives X, Y, Z may transmit information back to the controller via distance or position encoders. In the exemplary embodiment shown, the controller 40 is connected to a software module 42. This software module 42 may allow the access to a data memory 51, for example, and provide the data formats convertible by the controller 40.

According to the invention, for example, the software module 42 may be designed in such a way that it allows the manufacturing of one or more sample workpieces on the basis of predefined control data 45. These control data 45 may be predefined from a computer or another system via a connection 46, for example. The control data 45 are stored in a memory 51 and may be used directly for controlling the device 20 if the device 20 is designed for the purpose of directly converting these control data 45. For this purpose, the data is retrieved from the memory 51 via a connection indicated as 47. However, it is also conceivable, depending on the embodiment, for data in another form to be transferred into the memory 51 instead of control data. For example, the software module 42 may be used in such a way that it accepts these data via a connection 44 and converts them into control information or control data 48 before the execution of the manufacturing movements.

Figure 2:
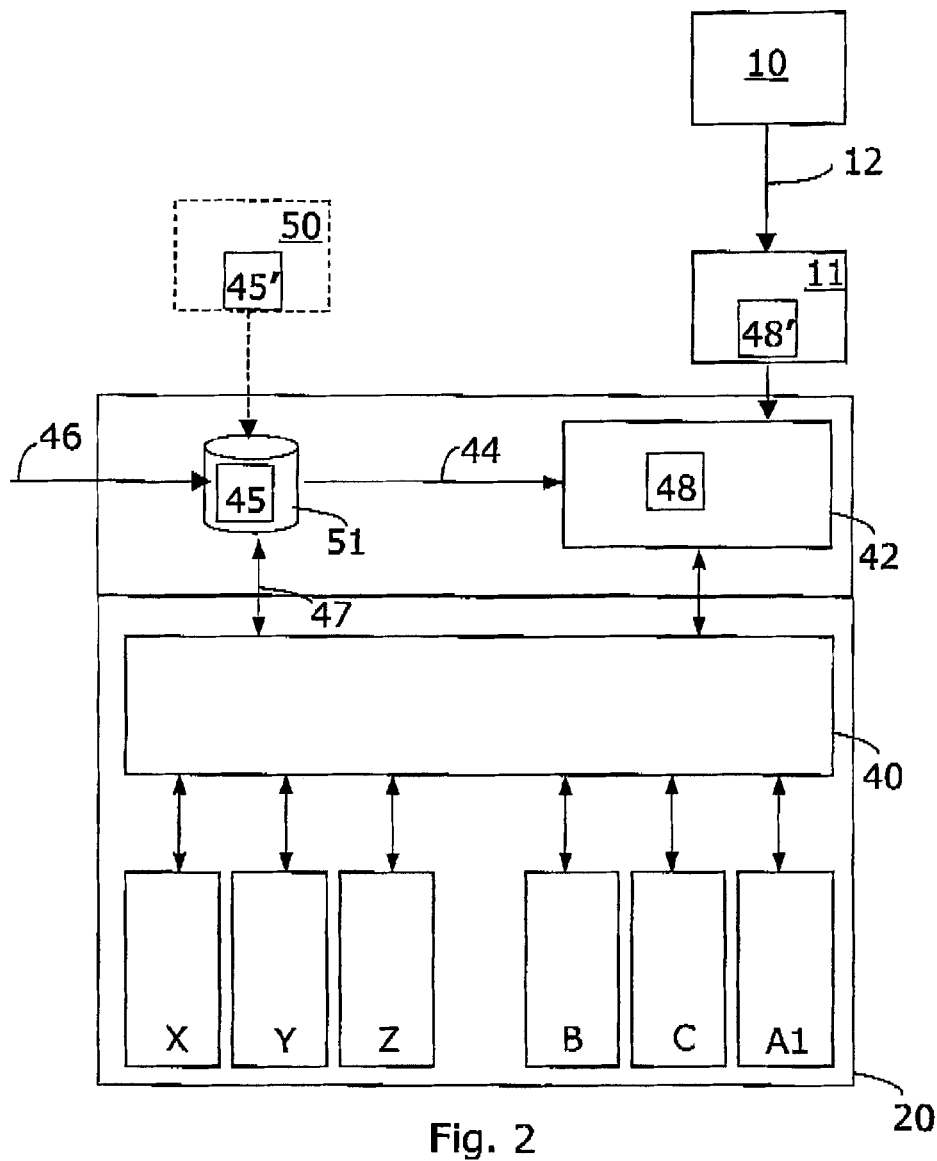
FIG. 2 shows a schematic block diagram of a device according to the invention.

As already noted in connection with FIG. 1, an embodiment is preferred in which the CNC controller 40 comprises a special software module (for example, software module 11), which allows it to accept data from a measuring machine tool 10, as schematically indicated in FIG. 2 on the basis of an arrow 12. The software module 11 ascertains altered control data 48' for the mass production therefrom.

Alternatively, the controller 40 receives or loads altered control data 45' from a measuring machine tool or a computer (e.g., a computer 50, as indicated in FIG. 2) connected to a measuring machine tool. These altered control data 45' may overwrite the control data 45 in the memory 51. This alternative is indicated in FIG. 2 by dashed lines. In this case, the altered control data 45' are used for the mass production.

Figure 3:
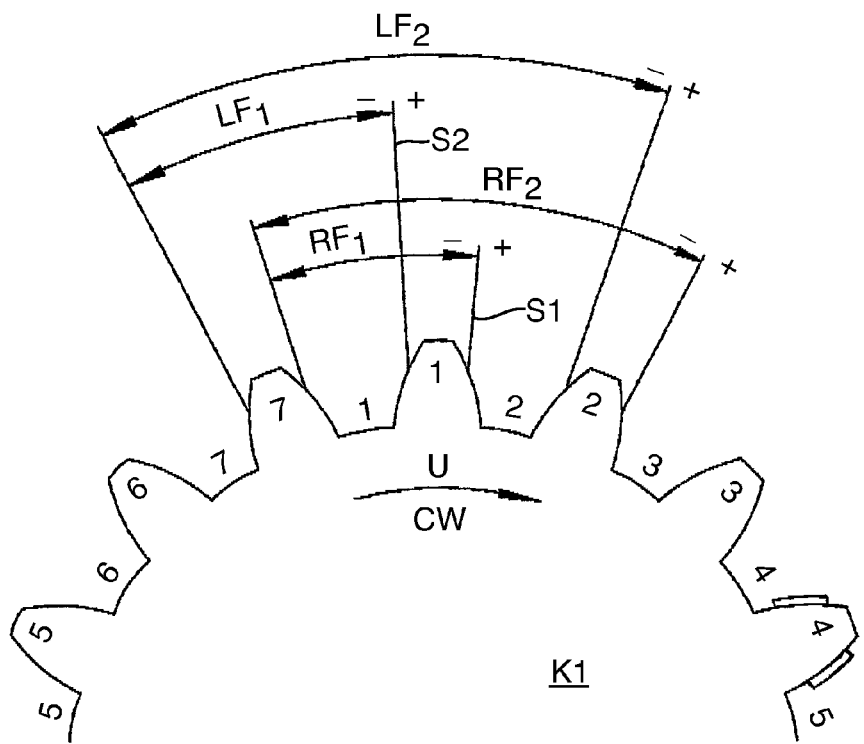
FIG. 3 shows a schematic illustration of a detail of a bevel gear pinion in a frontal section and the ascertainment of the indexing error according to the invention.

FIG. 3 shows a schematic illustration of a detail of a bevel gear pinion K1 in face section. The ascertainment of the indexing error according to the invention is explained on the basis of this image. According to the DIN standard, one starts from the last tooth number 7. All indexing errors are measured in relation to this tooth 7 (reference tooth). The indexing angle from the right (concave) side of the tooth 7 up to the right (concave) side of the tooth 1 is identified by $RF_1$ and the indexing angle from the left (convex) side of the tooth 7 up to the left (convex) side of the tooth 1 is identified by $LF_1$. The indexing angles of the other teeth are similarly always measured with reference to the seventh tooth. The lines S1 and S2 each represent the ideal or setpoint case, where there is no deviation. The angular deviations up or down are indicated by the "−" and "+" signs. The arrow U indicates the rotational direction.

Figure 4A:
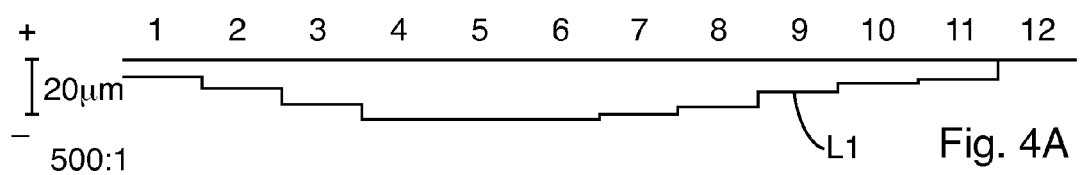
FIG. 4A shows a schematic illustration of the accumulated tooth-to-tooth indexing error on the left (convex) tooth flanks.

FIG. 4A shows a schematic illustration of the accumulated tooth-to-tooth indexing errors on the left (convex) tooth flanks. This example is a bevel gear pinion having a tooth count z=12. The teeth are numbered in FIG. 4A. The twelfth and last tooth is again the reference tooth. The cumulative indexing deviation is indicated by the line L1. All teeth 1 through 11 have an indexing error on the left tooth flank.

Figure 4B:
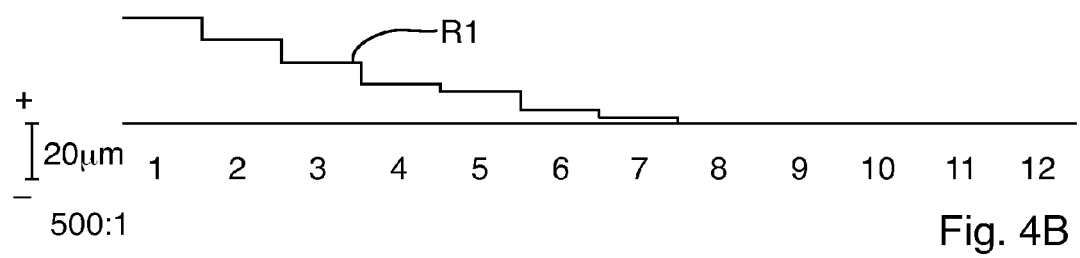
FIG. 4B shows a schematic illustration of the accumulated tooth-to-tooth indexing errors on the right (concave) tooth flanks.

FIG. 4B shows a schematic illustration of the cumulative tooth-to-tooth indexing error on the right (concave) tooth flanks of the same bevel gear pinion as in FIG. 4A. The teeth are also numbered in FIG. 4B. The cumulative indexing deviation is indicated by the line R1. All teeth 1 through 7 have an indexing error on the right tooth flank in the example shown.

Figure 4C:
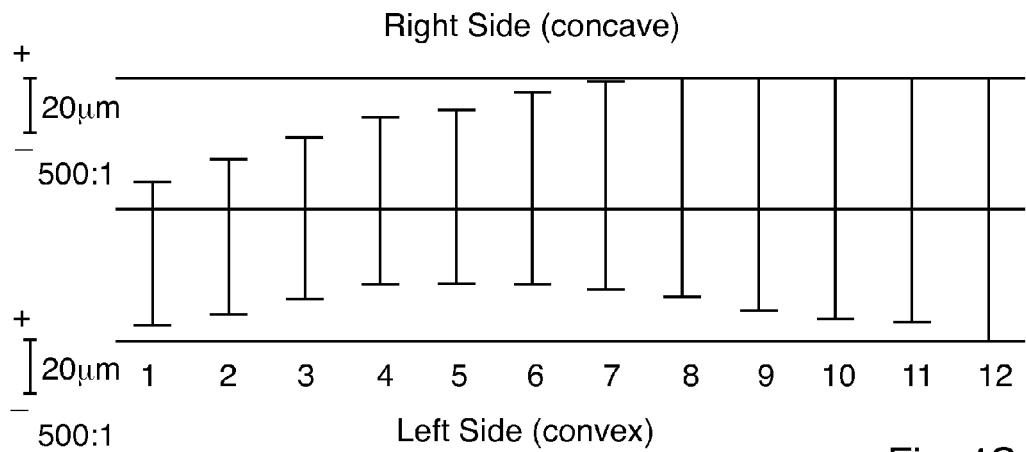
FIG. 4C shows a schematic illustration of the accumulated indexing error of the tooth gaps.

FIG. 4C shows a schematic illustration of the accumulated indexing error of the tooth gaps of the bevel gear pinion according to FIG. 4A and FIG. 4B. The width of the tooth gaps is shown by the length of the double-T-shaped strokes and the location of the tooth gaps is indicated by the displacement of the double-T-shaped strokes up and down. By definition, the twelfth gap has the correct gap width and position. All other tooth gaps show deviations.

Figure 5A:
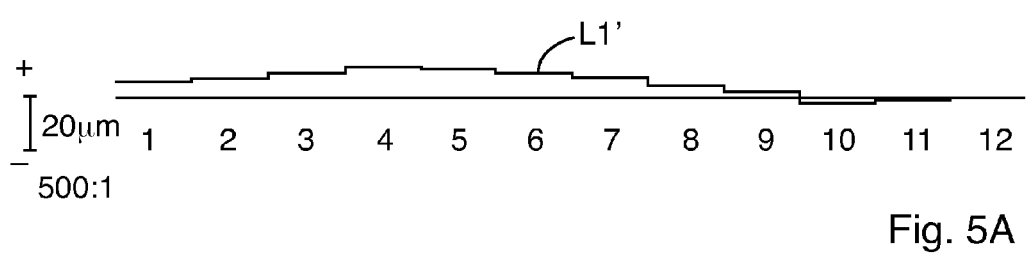
FIG. 5A shows a schematic illustration of the accumulated tooth-to-tooth indexing error on the left (convex) tooth flanks after the compensation according to the invention.
Figure 5B:
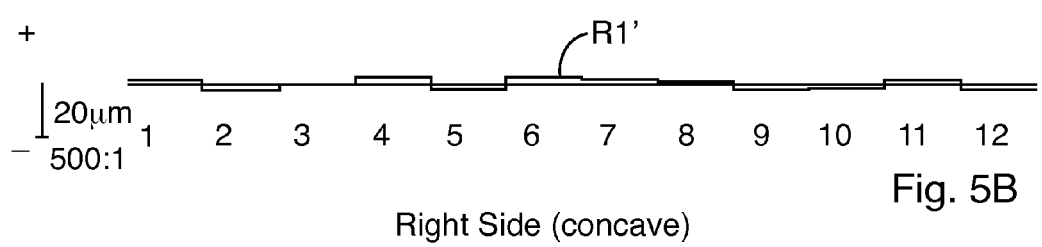
FIG. 5B shows a schematic illustration of the accumulated tooth-to-tooth indexing error on the right (concave) tooth flanks after the compensation according to the invention.
Figure 5C:
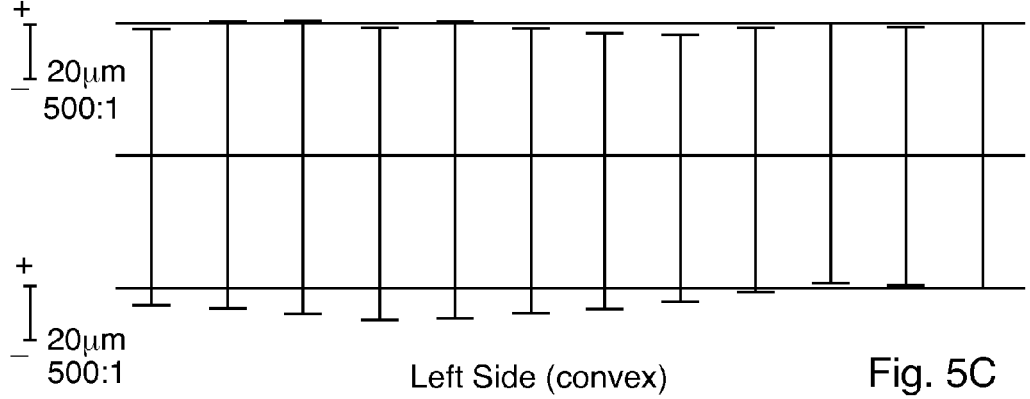
FIG. 5C shows a schematic illustration of the accumulated indexing error of the tooth gaps after the compensation according to the invention.

If one assumes that the images shown in FIGS. 4A through 4C are a reproduction of a sample workpiece, then the bevel gear pinions subsequently mass produced appear as shown in FIGS. 5A through 5C. Before this mass production begins, the indexing errors were corrected as described at the beginning.

FIG. 5A shows a schematic illustration of the cumulative tooth-to-tooth indexing error on the left (convex) tooth flank of a mass-produced bevel gear pinion. The cumulative indexing deviation is indicated by the line L1'. Only the teeth 1 through 8 still have visible indexing errors on the left tooth flank.

FIG. 5B shows a schematic illustration of the cumulative tooth-to-tooth indexing error on the right (concave) tooth flank of the mass-produced bevel gear pinion. The cumulative indexing deviation is indicated by the line R1'. The indexing deviation of all teeth is now very small on this flank.

FIG. 5C shows a schematic illustration of the accumulated indexing error of the tooth gaps of the mass-produced bevel gear pinion. All other tooth gaps only still show slight deviations in the position. The gap widths are nearly ideal.

Of course, the invention may also be used for manufacturing individual bevel gears.

Figure 6A:
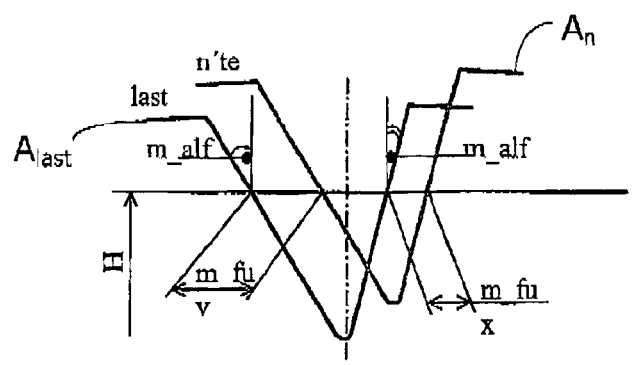
FIGS. 6A-6C shows further details of the compensation according to the invention.
Figure 6B:
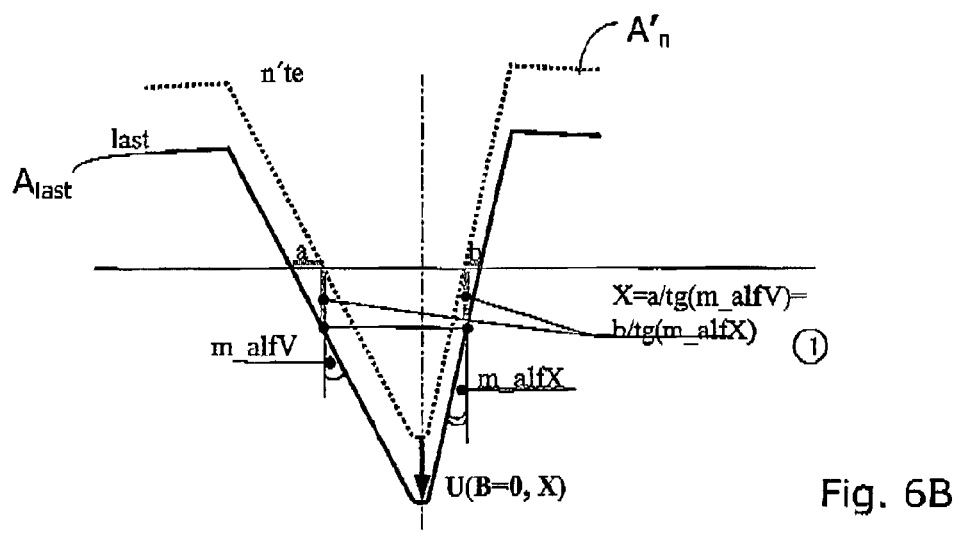
Figure 6C:
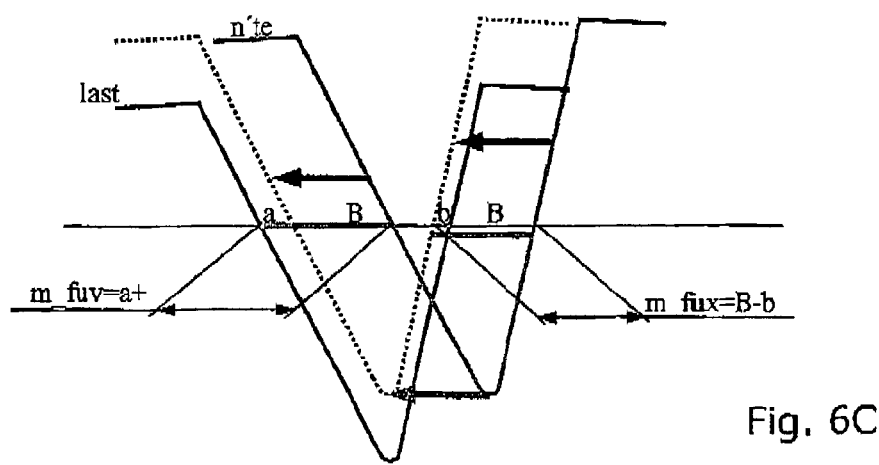

The mathematical approach which is used in a currently preferred embodiment of the invention for ascertaining the indexing errors is shown in FIGS. 6A through 6C. One begins from the tooth gaps. The same approach may also be performed using the teeth, however. In FIG. 6A, the tooth gap left of the reference tooth is identified by the line $A_{last}$ and the tooth gap left of another tooth (the nth tooth) is identified by the line $A_n$. It may be seen that the nth tooth gap is seated too far up and has a somewhat smaller gap width. An intermediate step of the method is shown in FIG. 6B. The tooth gap $A_n$ was shifted to the left and is now identified by $A'_n$, because it is a compensated or corrected tooth gap. The shift is performed in such a way that the center lines of the two tooth gaps are congruent. In this instantaneous picture, the direction of the plunging depth U (B=0, X) in the radial direction may be ascertained. The radial distance X of the flanks to one another may also be ascertained.

The last gap is shown by the line $A_{last}$ and corresponds to the setpoint position of the nth gap, which is indicated by the line $A_n$. The deviation of the two flanks is identified by fu in each case. The value of the deviation corresponds to the deviations shown in the measuring log in FIGS. 4A and 4B.

The nth gap is shifted via a depth change X (plunging movement) and workpiece rotation B (indexing movement) in such a way that the deviation fu (in FIGS. 6A and 6B) becomes zero. This is performed with each gap.

As described, the indexing error is ascertained in a gear-cutting measurement center 10, which is at least temporarily linked to the device 20 and may form a type of closed loop. The ascertainment of the indexing error is performed individually for all teeth of the sample workpiece and the indexing errors are thus measured in relation to the neutral data or master data.

The ascertainment according to the invention of the suitable indexing error compensation is based on summation indexing errors per tooth for both flanks (concave and convex) and is always related to the last tooth, as described. The deviation is set to zero there. The machine or control data is adapted in the closed loop. For this purpose, correction values (offset) or correction factors are transferred online to the device 20 and these are incorporated/applied therein to the machine tool or control data. This means that the gear-cutting measurement center 10 only transfers the correction values (offset) or correction factors.

According to the invention, the measurement center 10 is designed in such a way that it may perform the novel method for ascertaining the indexing error on one hand and may then ascertain the correction values (offset) or correction factors. Furthermore, the measurement center 10 must be designed in such a way that it may transfer these correction values (offset) or correction factors in a suitable form to the device 20 via an interface or connection 12.

The teeth are preferably not altered, but rather the position of the gaps and their depth. This is preferably performed by the computer superposition of triangles, as shown in FIGS. 6A and 6C. The indexing error compensation is performed per tooth gap, so that each individual tooth gap appears and is positioned as is required in relation to the last tooth gap.

In a preferred embodiment, a tolerance may be predefined and then only those teeth or tooth gaps which lie outside the tolerance are corrected individually.

The invention claimed is:

1. A method for producing bevel gears (31) compensated for workpiece indexing error, using a device (20) which comprises a workpiece spindle (42) for receiving the bevel gear (31), a tool spindle (42) for receiving the tool (24), and multiple drives (X, Y, Z, B, C, A1) for machining the bevel gear (31) using the tool (24) in the single-indexing completing method, having the following steps:
   predefining master or neutral data which describe the shape of a bevel gear (31) to be mass produced and the required machine tool kinematics,
   executing the following machining steps on the basis of the master data or neutral data,
   a) machining one tooth gap of a sample workpiece using the tool (24) by executing a machining movement,
   b) executing a relative movement between the tool (24) and sample workpiece to remove the tool (24) from the tooth gap,
   c) executing an indexing rotation to transfer the sample workpiece into another angular position,
   d) machining a further tooth gap of the sample workpiece using the tool (24) by repeated execution of steps a)-c), these steps being repeated until all tooth gaps of the sample workpiece are manufactured,
   transferring the sample workpiece to a measurement system (10),
   ascertaining an indexing error of each tooth of the sample workpiece,
   ascertaining correction values or correction factors per tooth or tooth gap for correcting said indexing error, one tooth or tooth gap of the sample workpiece being used as a reference,
   transmitting or accepting the correction values or correction factors,
   adapting the machine data or neutral data of the device (20) on the basis of the correction values or correction factors as a preparation for the manufacture of at least one bevel gear (31) compensated for indexing errors,
   producing at least one bevel gear compensated for indexing errors using the adapted machine data by executing steps a)-d), these steps being repeated until all tooth gaps of the bevel gear (31) compensated for indexing errors are manufactured.

2. The method according to claim 1, characterized in that each tooth or each tooth gap experiences an individual correction of said indexing error.

3. The method according to claim 1, characterized in that a tolerance of said indexing error is predefined and only those teeth or tooth gaps which lie outside the tolerance experience an individual correction of said indexing error.

4. The method according to claim 1, characterized in that it is a bevel gear milling method.

5. The method according to claim 1, characterized in that it is a grinding method.

6. The method according to claim 1, characterized in that it is a dry milling method.

7. The method according to claim 5, characterized in that it is a method using a grinding disc.

8. The method according to claim 7, characterized in that said grinding disc is dressed during execution of said method.

* * * * *